W. A. BERNARD.
PLIERS OR SIMILAR TOOL.
APPLICATION FILED NOV. 20, 1912.

1,134,177.

Patented Apr. 6, 1915.
3 SHEETS—SHEET 1.

WITNESSES:
T. S. Coleman
F. H. Wiggin

INVENTOR:
William A. Bernard
BY
Beach & Fisher
ATTORNEYS.

W. A. BERNARD.
PLIERS OR SIMILAR TOOL.
APPLICATION FILED NOV. 20, 1912.
1,134,177.
Patented Apr. 6, 1915.
3 SHEETS—SHEET 2.
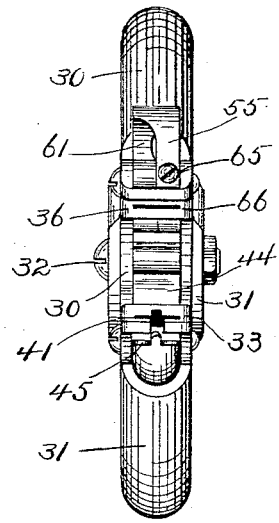
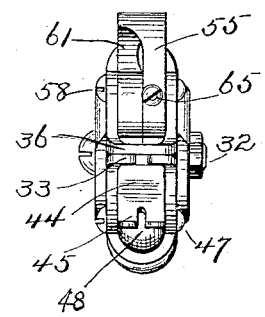
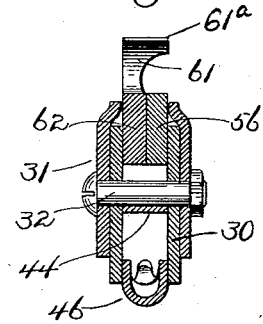
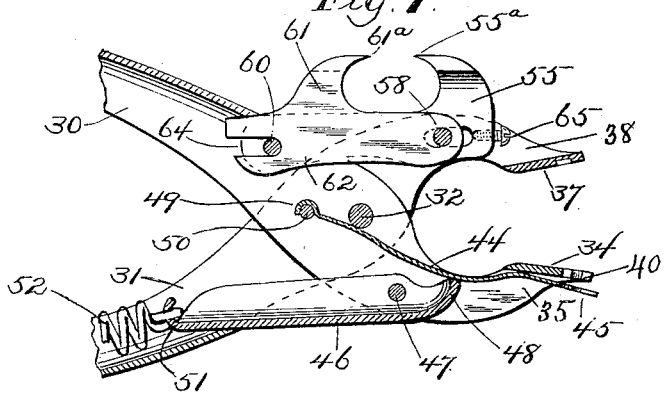
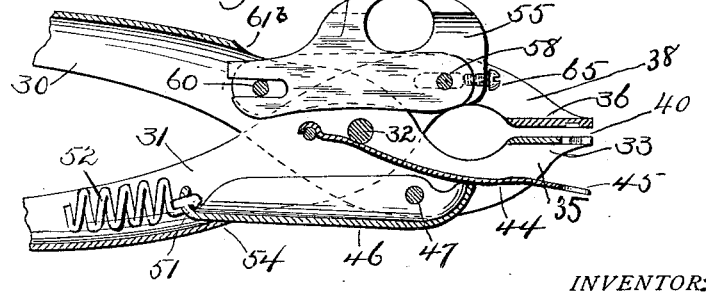

W. A. BERNARD.
PLIERS OR SIMILAR TOOL.
APPLICATION FILED NOV. 20, 1912.
1,134,177.
Patented Apr. 6, 1915.
3 SHEETS—SHEET 3.
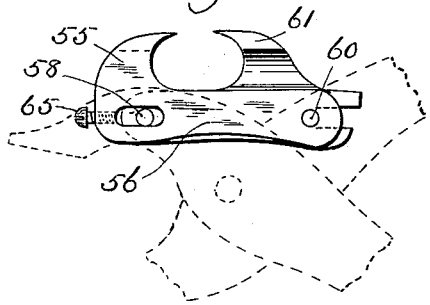
Fig. 10.
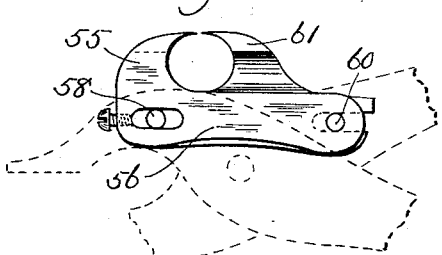
Fig. 11.
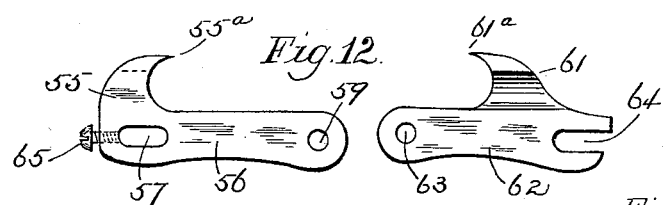
Fig. 12.
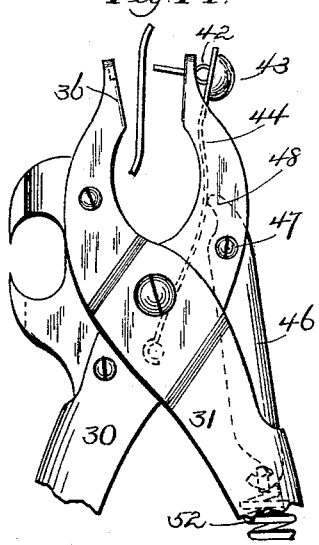
Fig. 13.
Fig. 14.
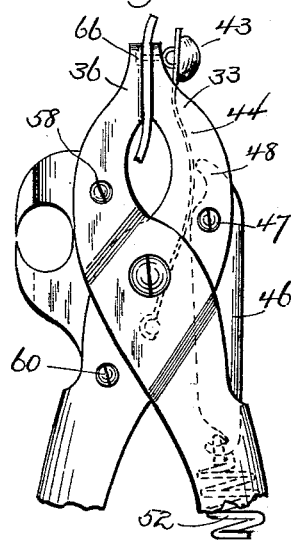
Fig. 15.
WITNESSES:
J. S. Coleman
F. H. Wiggin
INVENTOR:
William A. Bernard
BY
Beach & Fisher
ATTORNEYS.

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT, A CORPORATION OF CONNECTICUT.

PLIERS OR SIMILAR TOOL.

1,134,177. Specification of Letters Patent. Patented Apr. 6, 1915.

Application filed November 20, 1912. Serial No. 732,550.

*To all whom it may concern:*

Be it known that I, WILLIAM A. BERNARD, a citizen of the United States, residing in New Haven, county of New Haven, and State of Connecticut, have invented certain new and useful Improvements in Pliers or Similar Tools, of which the following is a full, clear, and exact description.

This invention relates to a compound tool of the plier or lever handle type particularly applicable as a means for attaching buttons to shoes or other articles and for cutting off buttons from shoes and the like. When so employed my improved tool forms a very handy, convenient and efficient device for applying buttons by means of wire staples or the like and for cutting off buttons so applied. The device has peculiar advantages as a shoe button tool for it may be placed on the market at a low cost, and as it may be easily operated by any one without special skill, it is admirably adapted for use in the home as well as in shoe stores. Various features of the invention, however, are not limited in their utility to the purposes above mentioned and will be found advantageous in devices and tools used for widely varying purposes.

The primary objects of the invention are to provide an improved form of end cutter for a tool having main jaws operated by lever handles; to furnish a tool of the type just named with a novel and efficient auxiliary jaw or jaws having a unique relation to the main jaws and lever handles, and applicable to various purposes; and to improve generally the construction and operation of devices of the class to which my invention relates.

To these and other ends, the invention consists in the novel features and combinations of parts to be hereinafter described and claimed.

Figure 1:
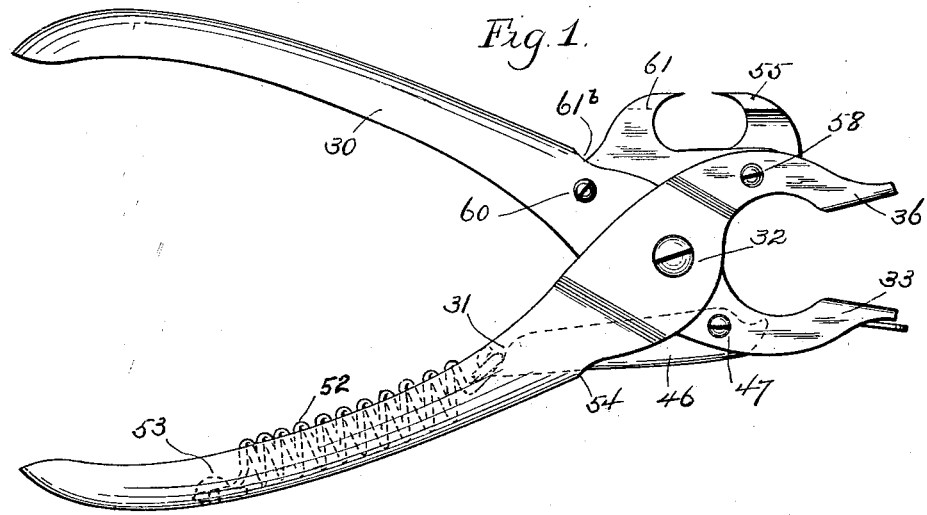
Figure 2:
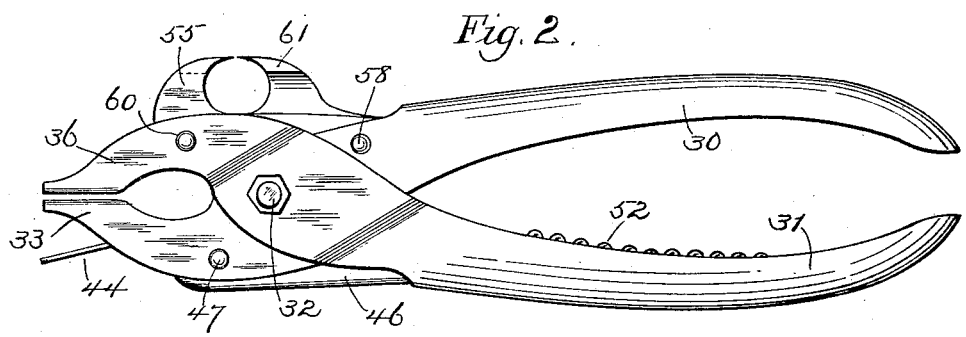
Figure 3:
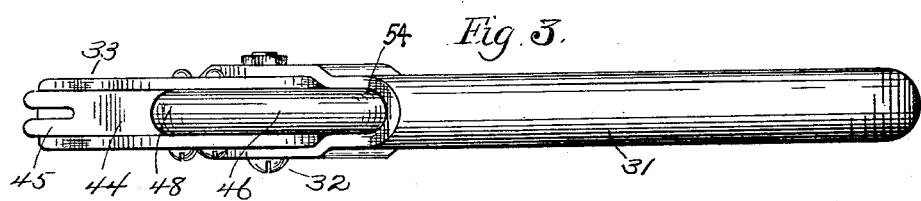
Figure 4:
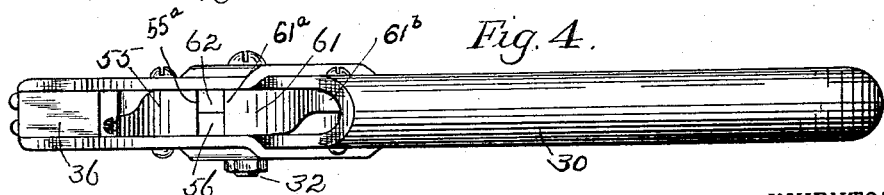

In the accompanying drawings, Figure 1 is a side elevation of a tool embodying my improvements, showing the main clenching jaws and the subsidiary cutting jaws in their open position, Fig. 2 is a view from the opposite side showing the jaws closed, Fig. 3 is a bottom plan view of Fig. 2, Fig. 4 is a similar top plan view illustrating the parts in the position shown in Fig. 1, Fig. 5 is a front end view of Fig. 1, Fig. 6 is a front end view of Fig. 2, Fig. 7 is a vertical longitudinal section of the jaw portion of the tool showing the jaws opened, Fig. 8 is a similar view showing the jaws closed, Fig. 9 is a transverse section through the main pivot with the parts in the position shown in Fig. 2, Figs. 10 and 11 are diagrammatic views of the subsidiary or auxiliary jaws viewed from the side opposite that shown in Figs. 7 and 8, Fig. 12 shows the subsidiary jaws, detached, and Figs. 13 to 15 inclusive are fragmentary views of the tool showing the different stages in the operation of applying a button.

Referring to the drawings, the levers 30, 31 which are preferably constructed of sheet metal, are pivoted together intermediate of their ends by a main pivot 32. Both levers are forked at their forward portions, as customary in devices of this type, the forked portion of the lever 30 being straddled by the forked portion of the lever 31 adjacent the pivot. In advance of the pivot the lever 30 is formed to present an integral jaw 33 constituted by a substantially flat inner wall 34, and side walls 35. The walls 35 are continuations of the fork at the forward end of said lever and the transverse wall 34 preferably joins them integrally although this is not an essential feature. The lever 31 is similarly provided at its forward end with a jaw 36 constituted by a transverse wall 37 joining the side walls or tines 38 of the fork. The jaw 33 serves as a support for a button and staple, and the jaw 36 serves as an anvil against which the inner ends of the staple are clenched. The staple 39 and eye 42 of the button 43 are held in a seat 40 in the jaw 33. The staple is held firmly in place in its seat by means of a tension device or spring 44 associated with the jaw 33 and having a forked end 45 embracing the eye of the button. The spring 44 contacts with the under surface of the button and normally urges the button away from the jaw 33 with considerable force so that the staple 39 is securely held in its seat. Hence it will be understood that the normal tendency of the spring 44 is to hold the button and staple securely in the jaw 33.

The effective tension of the spring 44 on the button and staple is controlled automatically as the angular relation of the levers 30, 31 is varied. This is effected by a controlling device such as a lever 46 pivoted to the jaw 33 by a pin 47 and having a nose 48 to engage the intermediate portion of the spring 44. The lever 46 is interposed between the side walls of the jaw 33 and passes into the crotch 54 of the lever 31. The spring 44 consists of a strip or leaf of spring metal having a bent lip 49 at the extremity opposite the fork 45, which lip is detachably engaged with a transverse pin 50 joining the side walls of the lever 30 and somewhat in the rear of the main pivot 32, as shown in Figs. 7 and 8. The intermediate portion of the spring reacts against the pivot 32 in such a manner that normally the button engaging end of the spring will be held away from the staple seat 41 at a considerable distance in order to seat firmly the button and staple in the manner above described. The controlling lever is held in contact with the spring by connection at its end 51 with a main controlling spring 52 which normally holds the lever handles spread apart. The lever 46 may be connected to the spring 52 by means of a hook at the rear end of the lever, as shown, and the opposite end of the spring 52 is connected with the handle of the lever 31 by means of a suitable fastening 53. The spring 52 normally exerts an angular pull on the lever 46, as shown by the dotted lines in Fig. 1, and this pulling action on the lever not only tends to spread the jaws of the tool but also to hold the lever 46 in such an angular position with respect to its pivot 47 that the button holding spring 44 will be pressed by the nose 48 into close proximity to the staple seat, as shown in Fig. 7. As the lever handles are pressed together, however, in opposition to the spring 52, the lever 46 will be engaged by the crotch portion 54 of the lever 31, whereby the lever 46 is pivotally swung to release the spring 44 and permit said spring to seat firmly the button and staple.

It will be understood from the foregoing, that the jaw 33 serves as a support for the button and staple and also as a support for the controlling device 46 of the button seating spring. Moreover, said jaw serves to connect the main handle lever 30 to the main handle spring 52 with which it is connected by the controlling device 46. The latter device therefore serves the additional function of connecting the handle spring to one of the lever members. The tendency of the handle spring is to approach the fastening device 53 and the pivot 47 relatively to each other as far as possible and thereby spread the jaws, and as the connecting points 53 and 47 are separated by the closing of the jaws, the spring will quickly pull the jaws apart as soon as the handles are released.

The anvil jaw 36 serves as a mounting for a sliding auxiliary jaw 55. This jaw is provided with a shank 56 having at one end a slot 57 slidably engaged with a cross pin 58 connecting the tines of the jaw 36. The opposite end of the shank 56 is provided with a perforation 59 by means of which the jaw 55 is pivoted on a pivot pin 60 extending between the tines of the lever 30 at or near the crotch 61$^b$ of the fork of said lever. The pin 60 is carried by one of the lever members at the rear of the main pivot 32, and the pin 58 is carried by the other lever member in advance of said main pivot. When the lever members are moved toward each other the pin 60 will be moved toward the right with reference to Fig. 10 thereby sliding the jaw 55 in the same direction (rearwardly with respect to the tool) on the guide pin 58. The jaw 55 coöperates with a generally similar jaw 61 oppositely mounted with reference to the pins 58 and 60. The shank 62 of the jaw 61 is provided at one end with a perforation 63 by means of which the jaw is pivoted on the pin 58, and at the opposite end the shank 62 is provided with a slot 64 guided on the pin 60. Hence it will be understood that when the main jaws 33, 36 are moved from the position shown in Fig. 7 to that shown in Fig. 8, the pin 58 in being moved forwardly with reference to the tool will slide the jaw 61 forwardly toward the approaching jaw 55. Hence the auxiliary sliding jaws 55 and 61 will be separated from each other when the main jaws are spread apart as shown in Fig. 7, and will be approached toward each other as the main jaws are closed so that both pairs of jaws will be closed simultaneously. In the embodiment shown, the jaws 55, 61 are provided with cutting edges 55$^a$, 61$^a$ adapted to be used in cutting off buttons, as will be presently described. The edges 55$^a$, 61$^a$ extend transversely of the tool at one of the outer edges thereof parallel to the axis of the main jaws, and constitute what is termed an end cutter.

The shanks of the auxiliary members or jaws 55, 61 are guided side by side in the space between the side walls of the main jaw 36, and the cutting portions of the jaws overhang the respective shanks at opposite sides, so that the coöperating cutting edges are coextensive over a distance equal to the aggregate width of the two shanks, as shown in Figs. 6 and 9. These features are not essential, however, in the broad aspects of the invention.

In the form illustrated, I have shown a stop screw 65 movable into the slot 57 of the jaw 56 in order to arrest the closing of the auxiliary jaws at certain definite points if so desired.

The operation of the tool in applying buttons is substantially as follows: The button and staple are placed in the jaw 33 in the manner previously described while the main jaws are separated. At this time, the lever 46 will press the tension spring 44 toward the staple seat so that the connected button and staple may be easily seated. The levers 30, 31 are then pressed toward each other to a certain extent and the lever 46 will be swung to release the spring 44, so that the button and staple may be released by the operator, the spring being permitted to act and thereby preventing the displacement of the button and staple. The portion of the shoe or other article to which the button is to be attached is then interposed between the jaws, 33, 36 in the manner shown in Fig. 14, and said jaws are then brought together forcibly on the leather or other substance which will be pierced by the respective ends of the staple. As the staple ends are forced into contact with a suitably shaped anvil portion of the jaw 36, they will be turned in and tightly clenched against the inner surface of the leather. Hence the button will be securely attached to the leather, and as the handle levers are released by the operator to open the main jaws, the nose 48 of the controlling device 46 will press the spring 44 toward the staple seat and thereby permit the tool to be easily released from the button and staple.

The automatically controlled device for seating the button and staple is a very important feature in practice, inasmuch as the button and staple may be held securely in position in the tool prior to and during the button applying operation. After the button and staple have once been placed in position in the tool, they may be released at once by the operator, who may then manipulate the tool with one hand leaving the other hand free to hold the shoe or other article to which the button is to be applied. It is practically impossible for the button and staple to be displaced after the handle levers have been advanced toward each other to a comparatively slight extent.

When it is desired to remove a button from a shoe or other article, this may be readily done by using the end cutter constituted by the auxiliary jaws 55 and 61. These jaws are placed over the button so that their cutting edges will lie on opposite sides of the staple, and when the jaws are brought together the staple will be instantly severed without injury to the button, the eye of which will remain intact. This is another important advantage of my improved tool, for in many prior constructions it has been necessary to cut or injure the eye of the button in the operation of removing the latter.

A still further advantage of my device consists in the fact that buttons may be easily applied very close together owing to the fact that the tool, in operation, is usually placed transversely to the row of buttons. The main jaws 33, 36 are only slightly wider than a button of average size, so that the buttons may be grouped very closely together when the tool is used in this fashion. The cutting off of buttons grouped very closely together may be effected with even more facility when the cutting jaws 55, 61 are placed over the button to be detached, in a direction transversely of the line or row of buttons, as the cutting jaws are even narrower than the clenching jaws. In practice, the clenching jaws should be sufficiently wide to accommodate buttons of several different sizes. The size of the button, within certain limits, has no effect whatever on the efficiency of the tool, and this is a further feature of improvement as compared to the numerous machines now on the market, which are only adapted to buttons of a certain definite size.

Of course, I have not attempted to illustrate and describe the numerous modifications of the tool which may be adopted without digressing from my inventive idea as expressed in the claims. As previously intimated, the utility of the tool is not limited to the specific application which I have described, and my claims are intended to cover such obvious changes of the construction as will adapt the device to hold and operate on work other than buttons and similar articles.

I do not claim herein the means for clamping the button as the main jaws are approached toward each other, as such means forms the subject matter of a divisional application, Serial No. 762,874 filed April 22nd, 1913. (Patent No. 1,090,191, dated March 17th, 1914.)

What I claim is:

1. In a hand tool, the combination of crossed lever members pivoted together intermediate of the ends of one member, a pin carried by said last named member in advance of the pivot, a pin carried by the other member at the rear of the pivot, and oppositely sliding members having pivotal engagement with the respective pins, and sliding engagement with the respective pins; substantially as described.

2. In a hand tool, the combination of a pair of pivoted main jaws having rigid handles for operating the same, one of said jaws being of channeled cross section, and an end cutter located in said channeled jaw and composed of sliding subsidiary jaws operatively connected with the main jaws, and having cutting edges disposed parallel to the axis of the main jaws; substantially as described.

3. In a hand tool, the combination of crossed lever members pivoted together intermediate of their ends, at least one of said members being of channeled cross section, a pin carried by said channeled member in advance of the pivot, a second pin carried by the other member at the rear of the pivot, and a pair of sliding jaws having shanks located side by side between the side walls of said channeled member, each of said jaws having pivotal engagement with one of said pins, and sliding engagement with the other pin; substantially as described.

4. In a hand tool, the combination of crossed lever members pivoted together intermediate of their ends, at least one of said members being of channeled cross section, a pin carried by said channeled member in advance of the pivot, a second pin carried by the other member at the rear of the pivot, a pair of sliding jaws having shanks located side by side between the side walls of the channeled member, each of said jaws pivoted on one of said pins, and sliding on the other pin, and coöperating cutting edges on said sliding jaws arranged parallel to the axis of said lever members, and of greater width than the respective shanks of said jaws; substantially as described.

5. In a hand tool, the combination of crossed lever members pivoted together intermediate of their ends, said lever members having forked portions adjacent the pivot, and coöperating jaws at one side of the tool having shanks located side by side in the forked portions of both lever members, said jaws being provided with coöperating cutting edges extending parallel to the axis of said lever members; substantially as described.

6. In a hand tool, the combination of crossed lever members pivoted together intermediate of their ends, said lever members having forked portions adjacent the pivot, and coöperating jaws at one side of the tool having shanks located side by side in the forked portions of both lever members, said jaws being provided with coöperating cutting edges extending parallel to the axis of said lever members, and of greater width than the shanks of the respective jaws; substantially as described.

7. In a hand tool, the combination of lever members pivoted together intermediate of their ends, said lever members having forked portions adjacent the pivot, coöperating jaws at one side of the tool having shanks located in the forked portions of both lever members at that side of the tool, a cutting edge on one of said jaws overhanging the shank of said jaw at one side, and extending parallel to the axis of said lever members, and a cutting edge on the other jaw overhanging the shank of said jaw at the opposite side, and adapted to meet said first-named cutting edge; substantially as described.

8. In a hand tool, the combination of crossed lever members pivoted together intermediate of their ends, main jaws carried by said lever members in front of the pivot, a pin carried by one of said members in front of the pivot, a pin carried by the other member at the rear of the pivot, a subsidiary jaw having a shank pivoted to the first pin and slidable on the second pin, a second subsidiary jaw having a shank pivoted on the second pin and slidable on the first pin, whereby said subsidiary jaws slide toward each other as the main jaws are closed, and coöperating end cutting edges on said subsidiary jaws, one of said cutting edges overhanging the shank of its jaw at one side, and the other cutting edge overhanging the shank of its jaw at the other side; substantially as described.

9. In a tool of the plier type, the combination of main jaws, a pivot for said jaws, lever members for operating said jaws, formed integral therewith, said jaws being of channeled section, and said lever members being forked adjacent to the jaw pivot, a pair of subsidiary jaws at one side of the tool, having shanks located in the forked portions of said lever members, and means for sliding said subsidiary jaws toward and away from each other as the main jaws are operated; substantially as described.

10. In a tool of the plier type, the combination of lever members, having forked portions crossing each other, a pin connecting the respective forked portions, and pivoting them together, said members having pivotally movable main jaws carried thereby in front of the pivot, sliding subsidiary jaws located in the forked portions of said lever members at one side of the tool, means pivotally securing one of said subsidiary jaws in the forked portion of one lever in front of the main jaw pivot, and means pivotally securing the other subsidiary jaw in the forked portion of the other lever member at a point in the rear of the main jaw pivot, whereby the sliding subsidiary jaws are brought together when the pivoted main jaws are brought together; substantially as described.

11. In a tool of the plier type, crossed lever members, means pivoting said members together intermediate of their ends, jaws carried bodily by said lever members in front of the pivot, a pin carried by one of said members in front of the pivot, a second pin carried by the other member at the rear of the pivot, both of said pins being located at the same side of the tool, a subsidiary jaw pivoted to the first pin and slidable on the second pin, and a second subsidiary jaw to coöperate with the first, pivotally connected with the second pin, and slidably connected with the first pin, whereby said subsidiary jaws slide toward each other as the main jaws are closed; substantially as described.

12. In a tool of the plier type, a pair of main jaws, one of said jaws having opposite side walls, pivoted handles for operating said jaws, an end cutter comprising relatively movable members mounted between said side walls, and means for operating said end cutter as the main jaws are actuated; substantially as described.

In witness whereof, I have hereunto set my hand on the 19th day of November 1912.

WILLIAM A. BERNARD.

Witnesses:
　HENRY E. ROCKWELL,
　M. OLIVE WILLIAMS.

Copies of this patent may be obtained for five cents each, by addressing the "Commissioner of Patents, Washington, D. C."